B. ROSS.
VEHICLE TIRE.
APPLICATION FILED SEPT. 24, 1907.
916,784. Patented Mar. 30, 1909.
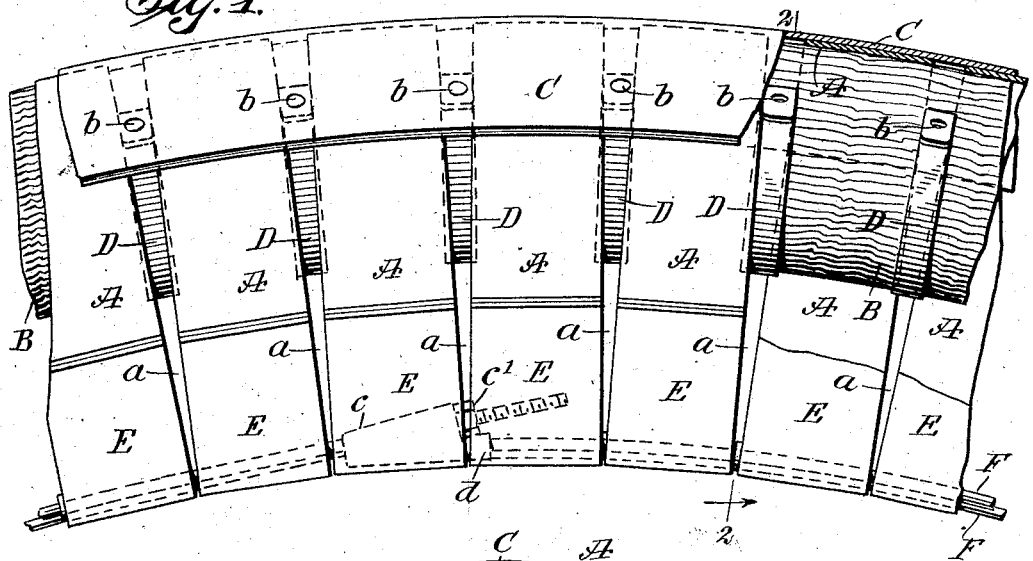
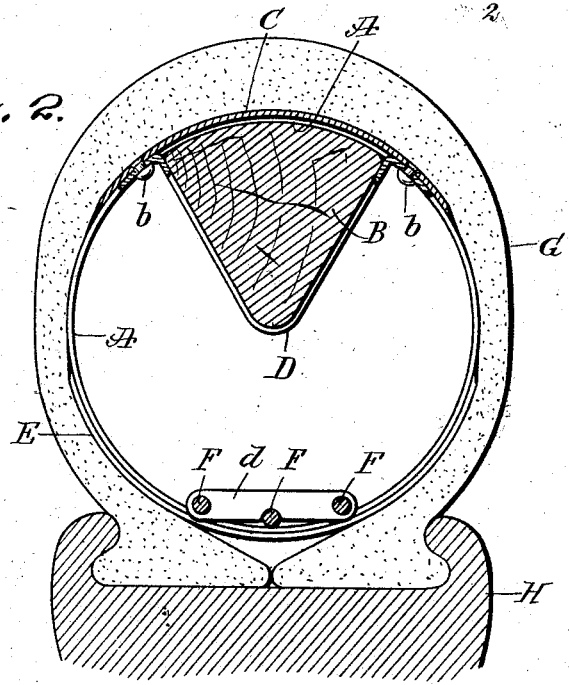
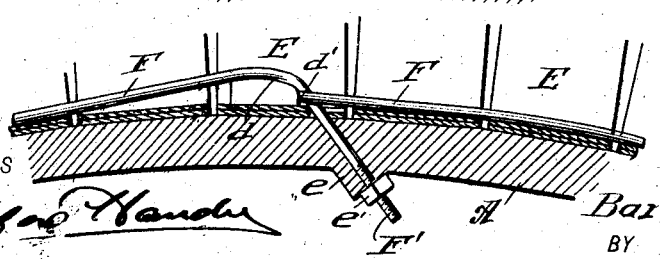
INVENTOR
Barton Ross

UNITED STATES PATENT OFFICE.

BARTON ROSS, OF BUFFALO, NEW YORK.

VEHICLE-TIRE.

No. 916,784.     Specification of Letters Patent.     Patented March 30, 1909.

Application filed September 24, 1907. Serial No. 394,325.

*To all whom it may concern:*

Be it known that I, BARTON ROSS, a citizen of the United States, and a resident of Buffalo, in the county of Erie and State of New York, have invented a new and Improved Vehicle-Tire, of which the following is a full, clear, and exact description.

This invention has for its object to provide novel details of construction for a vehicle tire, that are simple, practical and inexpensive, whereby great resilience is had by the tire, due to the joint employment of a hoop of suitable material, and novel reinforcing means coacting therewith, which adapt the improved tire to have superior elasticity, uniform expansion and great durability.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a partly sectional side view of a portion of the improved vehicle tire; Fig. 2 is a transverse sectional view of the same, substantially on the line 2—2 in Fig. 1 and Fig. 3 is a fragmentary side view of the improved tire, showing a modified means for securing the tire upon a wheel rim.

In the construction of the improved tire, a plurality of similar resilient rings A, having the form of bands are provided; said rings being of suitable width, are preferably integral in their walls. There is a hoop B, formed of wood or other suitable material, furnished as a core for the tire, and as shown in Fig. 2 the hoop if of either material is preferably triangular in cross section, having the rings A mounted thereon at equal short distances of separation. Upon the exterior of the hoop B and rings A, a preferably segmental cap-ring C is mounted, these ring segments being concave on their inner sides and convex exteriorly, which adapts them to fit closely upon the rings A.

Opposite the spaces *a* that are gaps between adjacent edges of the rings A, a series of plate metal straps D are located, and pass around the hoop B beneath the cap ring C, whereon end portions of the straps are secured by rivets or screws, as indicated at *b* in the drawings, these straps binding the rings A and cap ring upon the hoop B. Upon the lower sides of the assembled resilient rings A, are a plurality of reinforcing springs E, in the form of ring segments that are concavo-convex in cross section, their concave surfaces being seated upon the rings A. Within the rings A a plurality of open binding rings F, formed of wire rods or the like, are introduced, these rings each having a clamping sleeve *c* on one end thereof and a nut *c'* screwed upon the remaining end that is passed through the sleeve. The binding rings F are held spaced apart by thin blocks *d* that are provided in sufficient number for holding the rings parallel with each other and properly separated. The nuts *c'* are each located opposite a gap between two of the rings A, thus permitting the use of a thin wrench (not shown) which enables the turning of the nuts, and the contraction of the rings F upon the resilient rings A, whereby a completed metal ring or tire body is produced.

Upon the exterior of the composite tire body that has been described, a rubber tire G is mounted, said envelop being seated in a recess in the wheel rim H, whereby the tire is held firmly upon said wheel rim, cement, if necessary, being employed for securing the rubber envelop on the wheel rim.

In Fig. 3 a slightly modified means for securing the tire upon the wheel rim H is shown. In this construction the binding wires F are bent at an angle *d* near one end of each wire, thus providing an inclined member F' thereon, which is passed through a loop *d''* on the opposite end of a respective binding wire, and thence down through a perforation in the wheel rim H, whereon is formed or secured an angle washer *e* through which said inclined member trends. The threaded end portion F' of each wire F is furnished with a nut *e'*, that when tightly adjusted, draws the wires F forcibly upon the resilient rings A, and binds the composite tire upon the rim H.

It will be seen that the employment of the series of ring bands A, as attached upon a like side of the hoop B, coacting with the other details of construction, distributes load sustained by the structure throughout the tire, rendering it very strong, durable and elastic, as well as light, the provision of the reinforcing spring rings E being advantageous as a strengthening factor, and for preventing a lateral sway or skidding action of the tire.

Having thus described my invention, I claim as new and desire to secure by Letters Patent:

1. A resilient tire for vehicles, comprising a hoop, a plurality of resilient ring bands mounted in sequence on the hoop, and looped straps adapted for securing the ring bands on the same side of the hoop.

2. A resilient tire for vehicles, comprising a hoop, a plurality of resilient ring bands mounted in sequence on the hoop, a cap ring seated upon the resilient ring bands, and looped straps engaging the hoop between the ring bands and secured by their ends upon the cap ring.

3. A resilient tire for vehicles, comprising a hoop, a plurality of resilient ring bands mounted in sequence on the hoop, a cap ring seated upon the resilient ring bands over the hoop, straps in looped form passed around the hoop and secured by their ends upon the cap ring between the edges of the resilient ring bands, a plurality of reinforcing spring rings seated upon the resilient ring bands, and binding rings bearing upon the inner side of the resilient ring bands.

4. A resilient tire for vehicles, comprising a hoop substantially triangular in cross section, a plurality of resilient ring-bands mounted in sequence on the outer surface of the hoop, a resilient concavo-convex cap-ring mounted upon the ring-bands, a plurality of looped straps passed around the hoop between the ring-bands at their edges, means for securing the ends of said straps upon the inner surface of the cap-ring, reinforcing strips in ring form seated on the ring-bands, a plurality of binding-rings adapted for contraction and seating upon the inner side of the resilient ring bands, and a rubber tire enveloping the described tire structure and seated on a wheel-rim.

In testimony whereof I have signed my name to this specification in the presence of two subscribing witnesses.

BARTON ROSS.

Witnesses:
C. T. CLARK,
H. S. ROSS.